(12) United States Patent
Kim et al.

(10) Patent No.: US 12,238,437 B2
(45) Date of Patent: Feb. 25, 2025

(54) IMAGE SENSING DEVICE FOR GENERATING AN IMAGE SIGNAL BY DELETING BITS BASED ON A COUNT RESULT SIGNAL

(71) Applicant: SAMSUNG ELECTRONICS CO., LTD., Suwon-si (KR)

(72) Inventors: Sung Yong Kim, Hwaseong-si (KR); Jae Jin Jung, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 246 days.

(21) Appl. No.: 17/895,340

(22) Filed: Aug. 25, 2022

(65) Prior Publication Data

US 2023/0199345 A1   Jun. 22, 2023

(30) Foreign Application Priority Data

Dec. 21, 2021   (KR) ................. 10-2021-0183591

(51) Int. Cl.
*H04N 25/75* (2023.01)
*H04N 25/63* (2023.01)
*H04N 25/71* (2023.01)
*H04N 25/772* (2023.01)

(52) U.S. Cl.
CPC ............. *H04N 25/75* (2023.01); *H04N 25/63* (2023.01); *H04N 25/745* (2023.01); *H04N 25/772* (2023.01)

(58) Field of Classification Search
CPC .... H04N 25/63; H04N 25/745; H04N 25/772; H04N 25/78; H04N 25/76; H04N 25/57; H04N 25/75
See application file for complete search history.

(56) References Cited

U.S. PATENT DOCUMENTS

| | | | |
|---|---|---|---|
| 7,265,708 B2 | 9/2007 | Mitra et al. | |
| 7,710,479 B2 | 5/2010 | Nitta et al. | |
| 7,719,595 B1 | 5/2010 | Johnson et al. | |
| 2019/0335118 A1* | 10/2019 | Simolon | H04N 25/772 |
| 2022/0103771 A1* | 3/2022 | Roeven | H04N 25/616 |

FOREIGN PATENT DOCUMENTS

| | | |
|---|---|---|
| JP | H05189558 A | 7/1993 |
| JP | 2009088901 A | 4/2009 |
| JP | 2012004727 A | 1/2012 |
| KR | 20150009527 A | 1/2015 |

* cited by examiner

*Primary Examiner* — Nicholas G Giles
(74) *Attorney, Agent, or Firm* — Fish & Richardson P.C.

(57) ABSTRACT

An image sensing device providing improved image quality includes a pixel array that outputs a pixel signal, a comparator that outputs a comparison result signal by comparing a reference signal and the pixel signal, a counter that outputs a count result signal having m bits by counting the comparison result signal, and an image signal processor that outputs an image signal having n bits by correcting the count result signal, wherein m and n are integers, and m is greater than n.

9 Claims, 20 Drawing Sheets

100

500

530

100"

IMAGE SENSING DEVICE FOR GENERATING AN IMAGE SIGNAL BY DELETING BITS BASED ON A COUNT RESULT SIGNAL

CROSS-REFERENCE TO RELATED APPLICATION

A claim for priority under 35 U.S.C. § 119 is made to Korean Patent Application No. 10-2021-0183591 filed on Dec. 21, 2021 in the Korean Intellectual Property Office, the entirety of which is hereby incorporated by reference.

BACKGROUND

The present disclosure relates to image sensing devices, methods for sensing an image, and electronic devices including such image sensing devices and/or that perform such methods of sensing an image.

Image sensing devices typically are semiconductor elements that convert optical information into an electrical signal. Such an image sensing devices may either be charge coupled device (CCD) image sensing devices or complementary metal-oxide semiconductor (CMOS) image sensing devices.

A CMOS image sensing device (i.e., CMOS image sensor (CIS)) may include a plurality of pixels that are two-dimensionally arranged. Each of the pixels may include, for example, a photodiode (PD). The photodiode may serve to convert incident light into an electrical signal.

In recent years, with the development and advancement of the computer industry and communication industry, the demand for image sensors with improved performance has increased in various fields such as digital cameras, camcorders, smart phones, game devices, security cameras, medical micro cameras, and robots, among other technical areas.

SUMMARY

Embodiments of the inventive concepts provide an image sensing device, an electronic device and a method for sensing an image having improved image quality.

Embodiments of the inventive concepts provide an image sensing device including a pixel array that outputs a pixel signal; a comparator that outputs a comparison result signal by comparing a reference signal and the pixel signal; a counter that outputs a count result signal having m bits by counting the comparison result signal; and an image signal processor that outputs an image signal having n bits by correcting the count result signal, wherein m and n are integers, and m is greater than n.

Embodiments of the inventive concepts further provide an electronic device including an image sensor that generates a pixel signal; and an application processor that provides a high dynamic range (HDR) indication signal to the image sensor. The image sensor outputs an image signal having m bits when receiving the HDR indication signal, and outputs an image signal having n bits when not receiving the HDR indication signal, and m and n are integers and m is greater than n.

Embodiments of the inventive concepts still further provide a method for sensing an image including outputting a pixel signal by sensing light; outputting a first image signal having m bits by performing analog-to-digital conversion on the pixel signal; generating first intensity data based on an intensity value of the first image signal; and outputting a first corrected image signal by performing correction on the first image signal based on the first intensity data, wherein the first corrected image signal having n bits, and m and n are integers and m is greater than n.

BRIEF DESCRIPTION OF THE DRAWINGS

The above and other aspects and features of the present disclosure will become more apparent in view of the following detailed description made with reference to the accompanying drawings, in which.

DETAILED DESCRIPTION OF THE EMBODIMENTS

Hereinafter, exemplary embodiments of the present disclosure will be described with reference to the attached drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
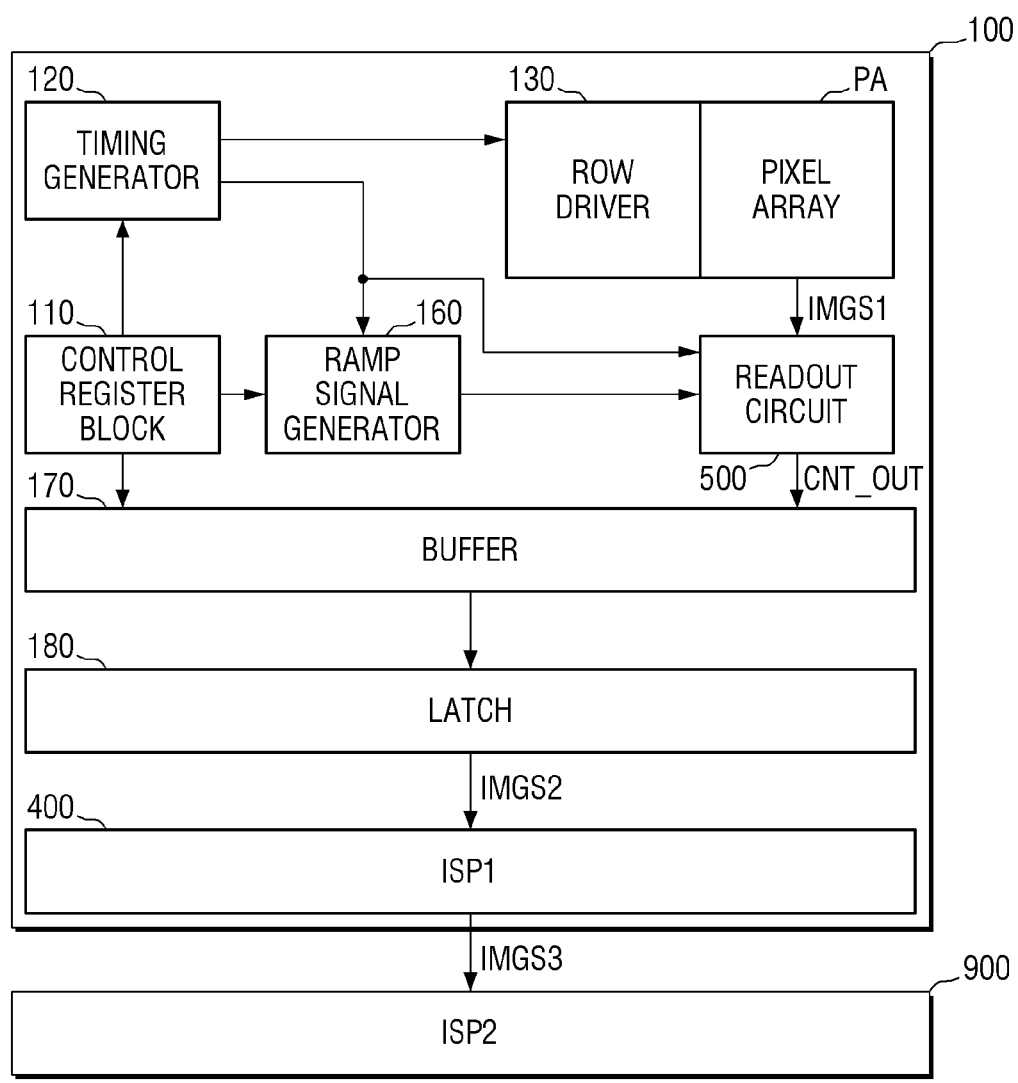
FIG. 1 illustrates a block diagram of an image sensing device according to embodiments of the inventive concepts.

FIG. 1 illustrates a block diagram of an image sensing device according to embodiments of the inventive concepts.

Referring to FIG. 1, an image sensing device 1 may include an image sensor 100 and a second image signal processor (ISP2) 900.

The image sensor 100 may generate a first image signal IMGS1 by sensing an image of a sensing target using light. In some exemplary embodiments, the generated first image signal IMGS1 may be, for example, a digital signal, but exemplary embodiments according to the technical spirit of the present disclosure are not limited thereto. In some embodiments, the generated first image signal may be an analog signal.

The first image signal IMGS1 may be provided from pixel array PA to a readout circuit 500, a buffer 170, and a latch 180 to be converted into a second image signal IMGS2. In this case, the readout circuit 500 may convert the first image signal IMGS1 into a count result signal CNT_OUT. The count result signal CNT_OUT may correspond to a result of converting the first image signal IMGS1 corresponding to an analog signal into a digital signal. The second image signal IMGS2 may correspond to a signal obtained by binning the count result signal CNT_OUT, but the exemplary embodiment of the present disclosure is not limited thereto. A first image signal processor 400 may output a third image signal IMGS3 by performing correction on the second image signal IMGS2. For example, the first image signal processor (ISP1) 400 may reduce a data capacity of the second image signal IMGS2.

The third image signal IMGS3 may be provided to and processed by the second image signal processor 900. The second image signal processor 900 may process the received third image signal IMGS3 to be easily displayed.

In some exemplary embodiments, the second image signal processor 900 may perform digital binning on the third image signal IMGS3 output from the image sensor 100. In this case, the third image signal IMGS3 output from the image sensor 100 may be the third image signal IMGS3 on which analog binning has already been performed.

In some exemplary embodiments, the image sensor 100 and the second image signal processor 900 may be disposed to be separated from each other as illustrated in FIG. 1. For example, the image sensor 100 may be mounted on a first chip and the second image signal processor 900 may be mounted on a second chip, and the image sensor 100 and the second image signal processor 900 may communicate with each other through a predetermined interface. However, exemplary embodiments are not limited thereto, and the image sensor 100 and the second image signal processor 900 may be implemented as one package, for example, a multi-chip package (MCP).

The image sensor 100 may include a control register block (e.g., circuit) 110, a timing generator 120, a row driver 130, a pixel array PA, a readout circuit 500, a ramp signal generator 160, and a buffer 170, a latch 180, and the first image signal processor 400.

The control register block 110 may generally control an operation of the image sensor 100. In particular, the control register block 110 may directly transmit an operation signal to the timing generator 120, the ramp signal generator 160, the readout circuit 500 (although a direct connection is not shown), and the buffer 170. In some exemplary embodiments, the control register block 110 may cause the readout circuit 500 to output the count result signal CNT_OUT through counting.

The timing generator 120 may generate operation timing reference signals for several components of the image sensor 100. The operation timing reference signals generated by the timing generator 120 may be transmitted to the row driver 130, the readout circuit 500, the ramp signal generator 160, and the like.

The ramp signal generator 160 may generate a ramp signal used by the readout circuit 500 and transmit the generated ramp signal to the readout circuit 500. For example, the readout circuit 500 may include a correlated double sampler (CDS), a comparator, and the like, and the ramp signal generator 160 may generate a ramp signal used by the correlated double sampler (CDS), the comparator, and the like, and transmit the generated ramp signal to the correlated double sampler (CDS), the comparator, and the like.

The buffer 170 may temporarily store the first image signal IMGS1 or the count result signal CNT_OUT. That is, the buffer 170 may store the generated second image signal IMGS2 in a binning mode, and may store the generated count result signal CNT_OUT when it is not in the binning mode. In addition, the latch 180 may latch and output the second image signal IMGS2 buffered in the buffer 170. The buffer 170 and the latch 180 may include memory such as DRAM or SRAM.

The pixel array PA may sense an external image. The pixel array PA may include a plurality of pixels (or unit pixels). The row driver 130 may selectively activate a row of the pixel array PA.

The readout circuit 500 may sample a pixel signal provided from the pixel array PA, compare the sampled pixel signal with the ramp signal, and then convert an analog image signal (data) into a digital image signal (data) based on a comparison result. That is, the readout circuit 500 may convert the first image signal IMGS1 from the pixel array PA into the count result signal CNT_OUT which is a digital image signal. A more detailed description thereof will be provided hereinafter.

The first image signal processor 400 may receive the second image signal IMGS2 from the latch 180. The first image signal processor 400 may be disposed to be separated from the second image signal processor 900. For example, the first image signal processor 400 may be disposed in the image sensing device 1, while the second image signal processor 900 may be implemented by an application processor or the like. The first image signal processor 400 may generate a third image signal IMGS3 by performing correction on the second image signal IMGS2.

Figure 2:
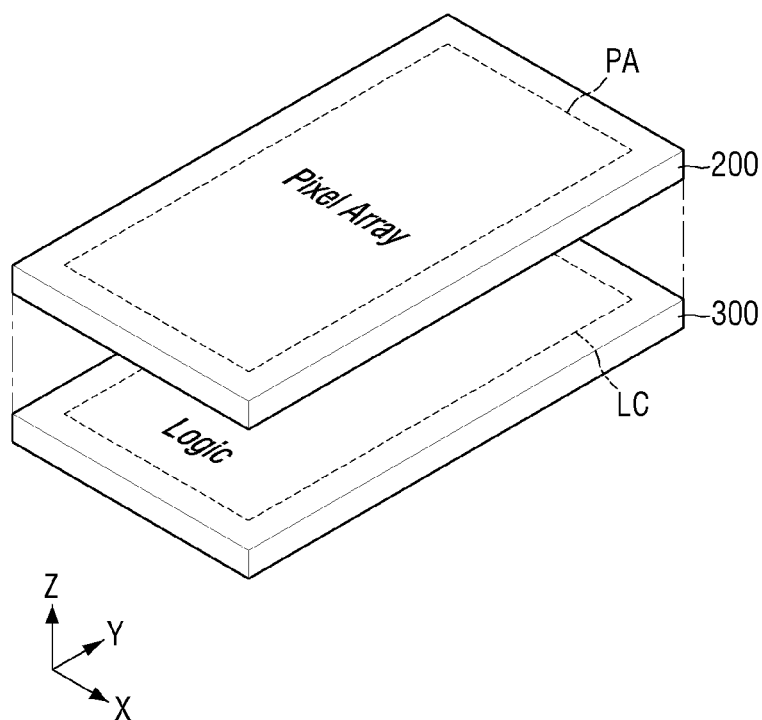
FIG. 2 illustrates a conceptual layout of the image sensor according to embodiments of the inventive concepts.

FIG. 2 illustrates a diagram of a conceptual layout of the image sensor according to embodiments of the inventive concepts.

Referring to FIG. 2, the image sensor 100 according to the present exemplary embodiment may include an upper chip 200 and a lower chip 300 that are stacked. A plurality of pixels may be disposed on the upper chip 200 in a two-dimensional array structure. That is, the upper chip 200 may include a pixel array PA. The lower chip 300 may include a logic area LC and a memory area (not shown in FIG. 2). The lower chip 300 may be disposed on a lower side of the upper chip 200 and may be electrically connected to the upper chip 200. The lower chip 300 may allow or include connections to enable a pixel signal transmitted from the upper chip 200 to be transmitted to the logic area LC of the lower chip 300.

Logic elements may be disposed in the logic area LC of the lower chip 300. The logic elements may include circuits for processing pixel signals from the pixels. For example, the logic elements may include the control register block 110, the timing generator 120, the row driver 130, the readout circuit 500, the ramp signal generator 160, the first image signal processor 400, and the like of FIG. 1. In addition, memory elements may be disposed on the lower chip 300. For example, the buffer 170 and the latch 180 may be disposed on the lower chip 300 as memory elements.

Figure 3:
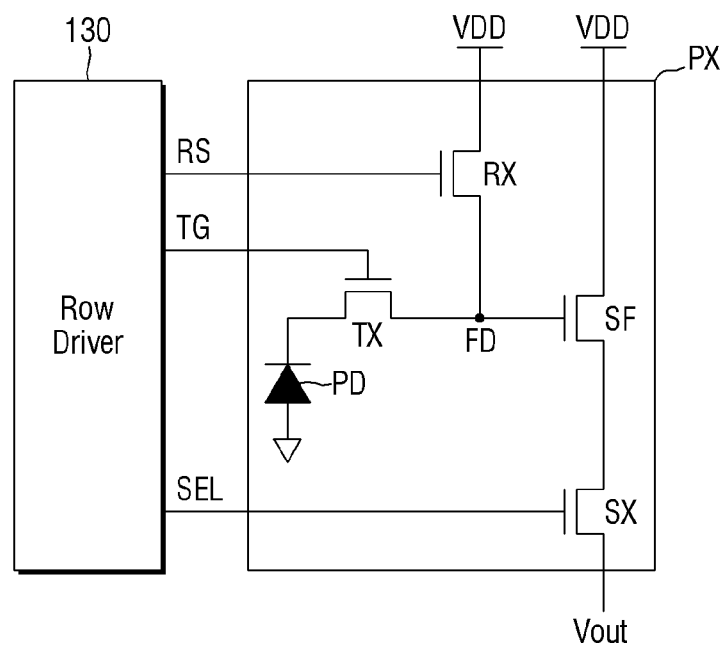
FIG. 3 illustrates a diagram of a pixel according to embodiments of the inventive concepts.

FIG. 3 illustrates a diagram descriptive of a pixel according to embodiments of the inventive concepts.

Referring to FIG. 3, the pixel PX may include a photodiode PD, a transmission transistor TX, a reset transistor RX, a source follower SF, and a selection transistor SX.

One end of the transmission transistor TX may be connected to the photodiode PD, the other end thereof may be connected to a floating diffusion region (FD), and a control electrode thereof may receive a control signal TG.

One end of the reset transistor RX may receive a source voltage VDD, the other end thereof may be connected to the floating diffusion region FD, and a control electrode thereof may receive a control signal RS. One end of the source follower SF may receive the source voltage VDD, the other end thereof may be connected to one end of the selection transistor SX, and a control electrode thereof may be connected to the floating diffusion region FD. The other end of the selection transistor SX may be connected to a column line CL, and a control electrode thereof may receive a control signal SEL.

Each of the control signals TG, RS, and SEL capable of controlling each of the transistors TX, RX, and SX may be output from the row driver 130. An output signal Vout of the selection transistor SX is supplied to the column line.

Although one photodiode PD and one transmission transistor TX are illustrated in FIG. 3 for convenience of explanation, the pixel may be implemented as a pixel in which the floating diffusion region FD is shared according to a designer's intention.

Figure 4:
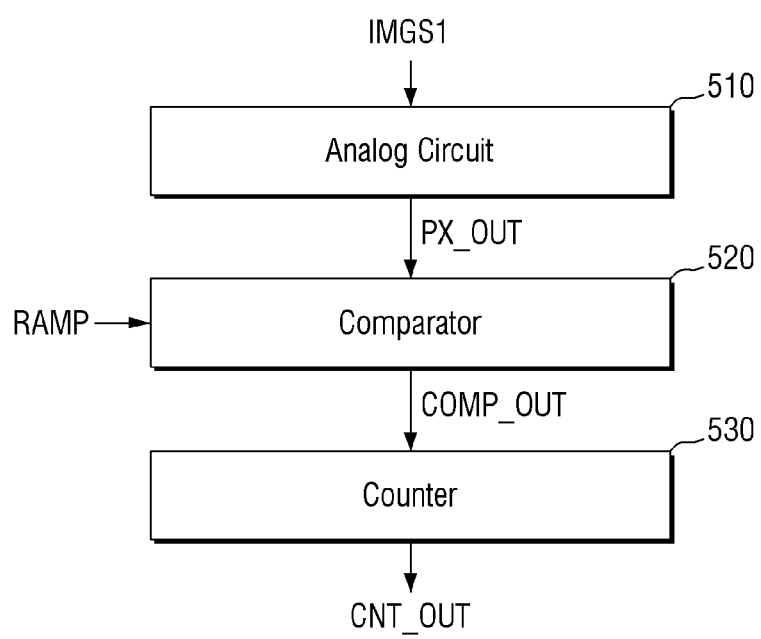
FIG. 4 illustrates a block diagram of a readout circuit according to embodiments of the inventive concepts.
Figure 5:
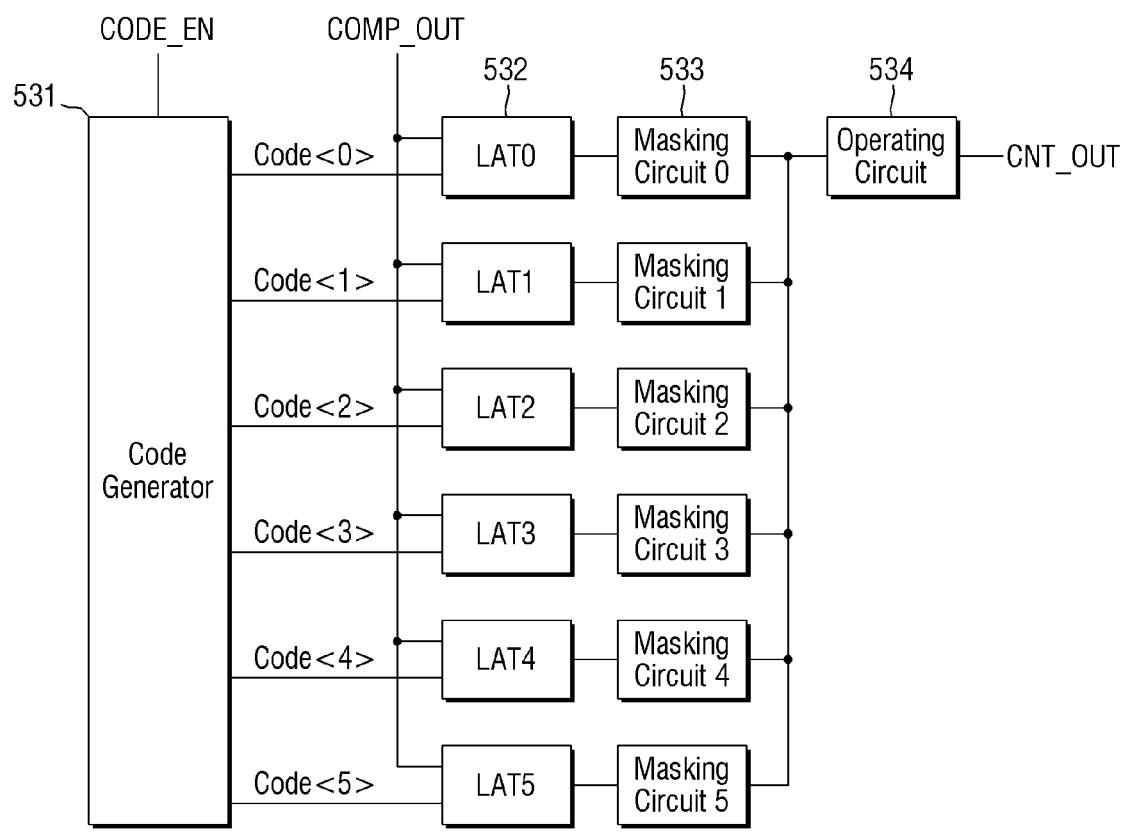
FIG. 5 illustrates a block diagram of a counter of FIG. 4.
Figure 6:
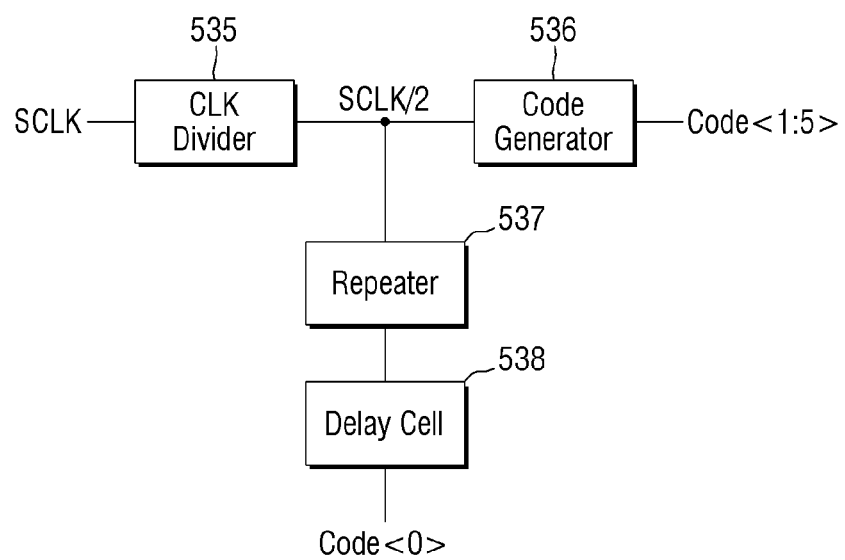
FIG. 6 illustrates a block diagram descriptive of a method of generating the count codes provided to the counter of FIG. 4.
Figure 7:
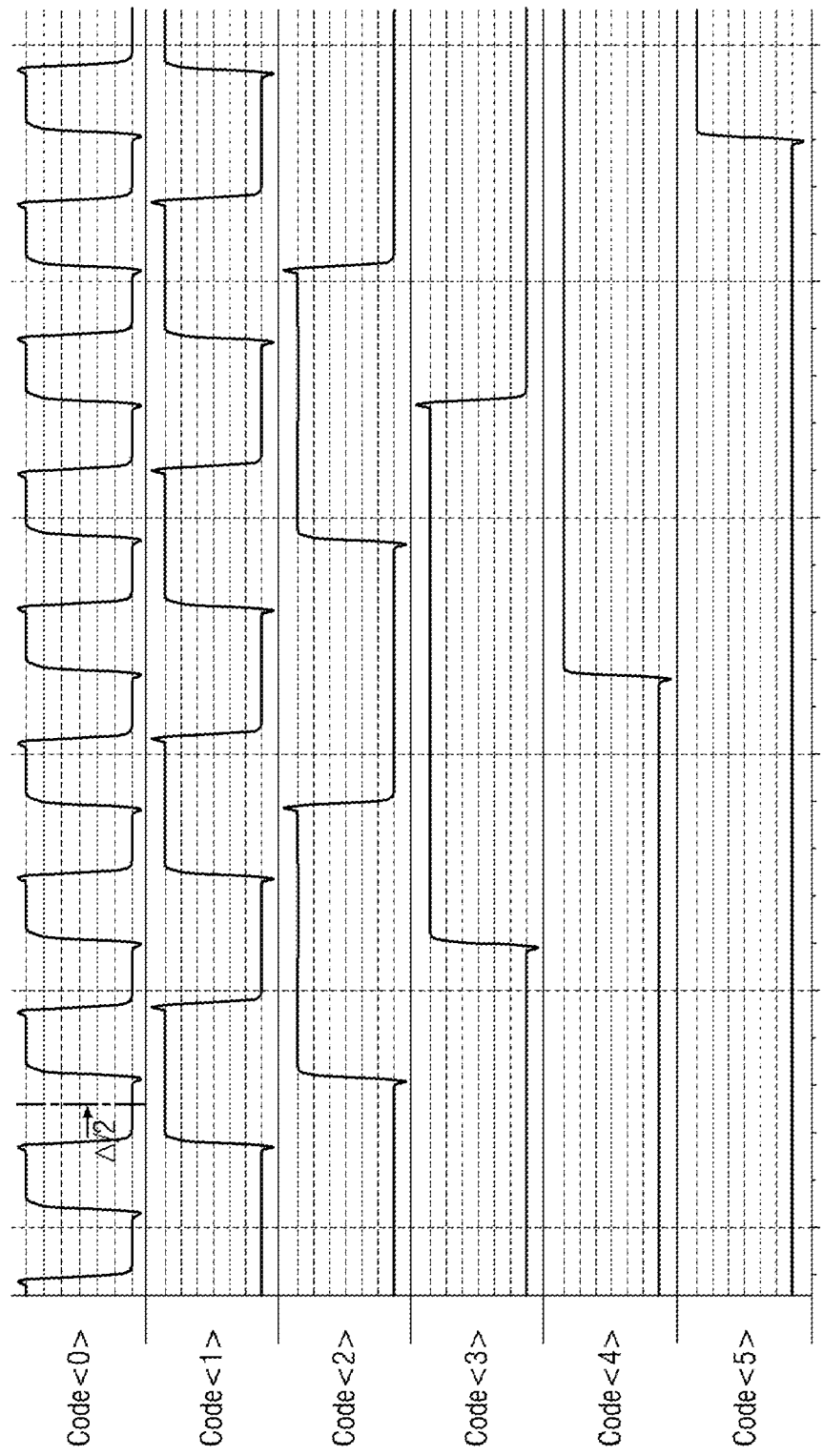
FIG. 7 illustrates count codes of FIG. 6.

FIG. 4 illustrates a block diagram of a readout circuit according to embodiments of the inventive concepts. FIG. 5 illustrates a block diagram of a counter of FIG. 4. FIG. 6 illustrates a block diagram descriptive of a method of generating a count code provided to the counter of FIG. 4, and FIG. 7 illustrates count codes of FIG. 6.

Referring to FIG. 4, the readout circuit 500 may include an analog circuit 510, a comparator 520, and a counter 530. The readout circuit 500 may receive the first image signal IMGS1 from the pixel array PA and receive the ramp signal RAMP from the ramp signal generator 160. The readout circuit 500 may generate and output the count result signal CNT_OUT based on the first image signal IMGS1 and the ramp signal RAMP.

The analog circuit 510 may receive the first image signal IMGS1 from the pixel array PA. The analog circuit 510 may provide the received first image signal IMGS1 as a pixel signal PX_OUT to the comparator 520. In this case, the pixel signal PX_OUT may be the same as the first image signal IMGS1, but the exemplary embodiment of the present disclosure is not limited thereto. For example, when the analog circuit 510 performs analog binning on the first image signal IMGS1, the pixel signal PX_OUT on which the analog binning has been performed on the first image signal IMGS1 may be output. However, the exemplary embodiment of the present disclosure is not limited thereto.

The comparator 520 may output a result of comparing the ramp signal RAMP and the pixel signal PX_OUT. For example, when a voltage level of the ramp signal RAMP is greater than a voltage level of the pixel signal PX_OUT, the comparator 520 may output a comparison result signal COMP_OUT corresponding to a logic value 1. In addition, for example, when the voltage level of the ramp signal RAMP is not greater than the voltage level of the pixel signal PX_OUT, the comparator 520 may output a comparison result signal COMP_OUT corresponding to a logic value 0. Here, the comparison result signal COMP_OUT may correspond to an analog signal. The comparator 520 may output a result of comparing the pixel signal PX_OUT and the ramp signal RAMP during an image sensing time section.

The counter 530 may output a count result signal CNT_OUT, which is a result obtained by performing counting on the comparison result signal COMP_OUT. The comparison result signal COMP_OUT may correspond to an analog signal, and the count result signal CNT_OUT may correspond to a digital signal. The counter 530 may output the count result signal CNT_OUT corresponding to a code value.

Referring to FIG. 5, the counter 530 may include a code generator 531, a plurality of latches (LAT0 to LAT5) 532, a plurality of masking circuits (masking circuit 0 to masking circuit 5) 533, and an operating circuit 534. For convenience of explanation, it is illustrated that the code generator 531 outputs 6-bit count codes Code<0> to Code<5>, but this is exemplary and the number of bits of the generated count code and the corresponding number of latches 532 and the masking circuits 533 may be changed.

The code generator 531 may receive a code generation clock signal CODE_EN from the timing generator 120 and output the count codes Code<0> to Code<5> according to the code generation clock signal CODE_EN. The count codes Code<0> to Code<5> may be respectively latched by a plurality of corresponding latches 532.

The plurality of latches 532 respectively latch corresponding count codes Code<0> to Code<5>. The latches 532 may latch the count codes Code<0> to Code<5> based on the level of the comparison result signal COMP_OUT output from the comparator 520, and provide count codes Code<0> to Code<5> to the operating circuit 534.

The masking circuits 533 may be disposed between the latches 532 and the operating circuit 534. The masking circuits 533 may control the count codes Code<0> to Code<5> to be transmitted to the operating circuit 534 through the latches 532. The masking circuits 533 may be respectively connected to one end (e.g., output ends) of the plurality of latches 532. For example, masking circuit 0 may be connected to the output end of Latch LAT0, and masking circuit 5 may be connected to the output end of Latch LAT5. In the present specification, the masking circuits 533 may also be referred to as a transmission control circuit(s).

The operating circuit 534 may be connected to one end (e.g., output ends) of the masking circuits 533, receive the count codes Code<0> to Code<5> generated by the code generator 531 and latched by the latches 532, and generate a count value to generate a digital signal. The operating circuit 534 may further include an adder, and may add and output count values counted using the count codes Code<0> to Code<5> corresponding to each bit.

In summary, the counter 530 may output the count result signal CNT_OUT based on the comparison result signal COMP_OUT and the count codes Code<0> to Code<5>. Here, the count result signal CNT_OUT may correspond to a code. In an exemplary embodiment of the present disclosure, the output count result signal CNT_OUT may be data corresponding to 12 bits. That is, the code of the count result signal CNT_OUT may correspond to a value of 0 to 4095. The counter 530 may output the count result signal CNT_OUT corresponding to 12 bits by counting the comparison result signal COMP_OUT based on the six count codes Code<0> to Code<5>. For example, the six codes Code<0> to Code<5> may be gray codes.

FIG. 6 illustrates a block diagram descriptive of a method for generating the count codes, and FIG. 7 illustrates the count codes. Referring to FIGS. 6 and 7, the code generator 531 may generate a plurality of count codes Code<0> to Code<5> based on a reference clock signal SCLK provided by the timing generator 120. A clock divider 535 may generate a divided clock signal SCLK/2 by dividing the reference clock signal SCLK. A repeater 537 and a delay cell 538 may generate a zero-th count code Code<0> by repeating and delaying the divided clock signal SCLK/2. For example, the delay cell 538 may generate the zero-th count code Code<0> by delaying the repeated divided clock signal SCLK/2. The code generator 536 may generate first to fifth count codes Code<1> to Code<5> based on the divided clock signal SCLK/2. The counter 530 shown in FIG. 5 may generate a count result signal CNT_OUT corresponding to 12 bits by performing counting based on the zero-th to fifth count codes Code<0> to Code<5>.

Figure 8:
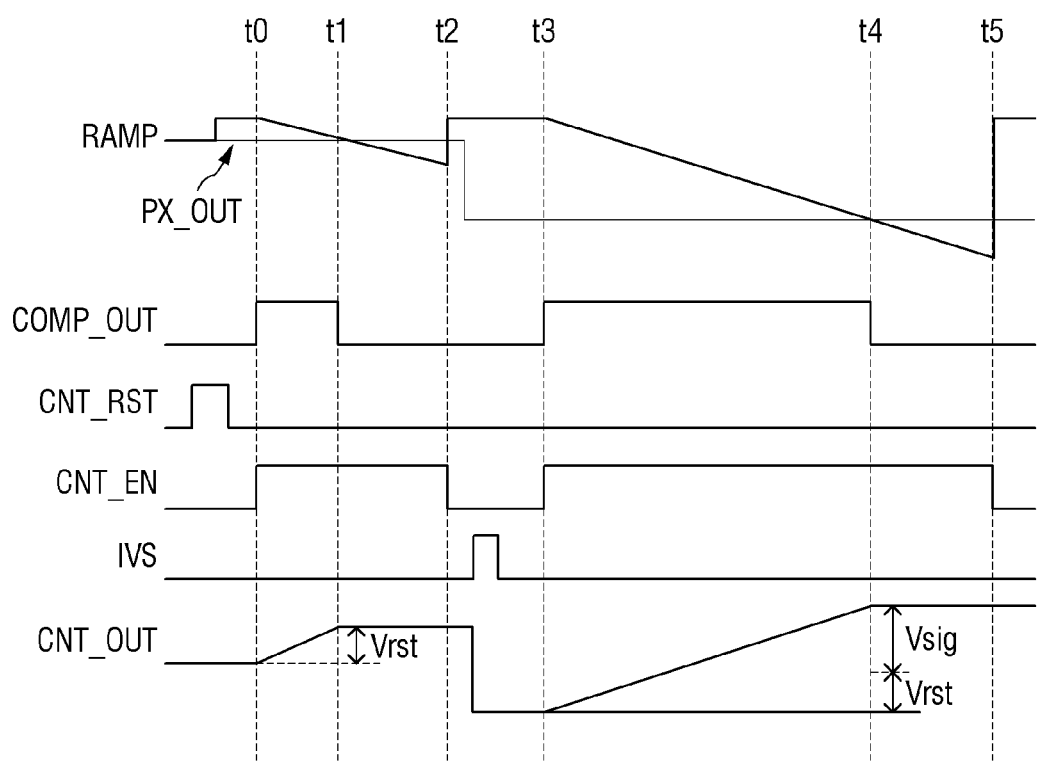
FIG. 8 illustrates a waveform diagram of signals descriptive of an operation of an analog-to-digital converter according to embodiments of the inventive concepts.

FIG. 8 illustrates a waveform diagram of signals descriptive of an operation of an analog-to-digital converter by readout circuit 500 according to embodiments of the inventive concepts.

Referring to FIG. 8, a method of converting an analog pixel signal PX_OUT sensed in each pixel PX of the pixel array PA into a digital signal may be performed as a method of comparing a time point at which a value of the ramp signal RAMP falling with a predetermined slope coincides with a value of the pixel signal PX_OUT from each pixel PX. Specifically, the conversion method may be performed by obtaining a count result value corresponding to each size of the pixel signal PX_OUT by counting from a first time point t0, which is a generation time of the ramp signal RAMP (e.g., a time point at which a falling starts), to a second time point t1 which is a time point at which the values of the ramp signal RAMP and the pixel signal PX_OUT coincide with each other. In this case, the pixel signal PX_OUT is output from a column line, and an image signal component Vsig appears after a reset component Vrst. The count result value may be the number of counts when the counting of the corresponding pixel signal PX_OUT is completed, and the count value may be the number of counts before the counting of the corresponding pixel signal PX_OUT is completed.

According to some exemplary embodiments, for the first reading, the comparator 520 inverts the comparison result signal COMP_OUT from a logic low level to a logic high level from the first time point t0 at which the ramp signal RAMP starts to fall to the second time point t1 at which the ramp signal RAMP becomes equal to the pixel signal PX_OUT. In this case, the counter 530 stops a counting operation at the second time point t1, which is the time point at which the comparison result signal COMP_OUT of the comparator 520 is inverted from the logic high level to the logic low level, and latches the count value up to that time point as data. According to some embodiments of the present disclosure, a count code Code<0:5> corresponding to the count value may be latched in the latch 532.

A count enable clock signal CNT_EN is input to the code generator 531 from the timing generator 120, and is toggled from the first time point t0 at which the ramp signal RAMP starts to fall to a last time point at which the ramp signal RAMP falls, that is, a third time point t2 at which the ramp signal RAMP becomes greater than the pixel signal PX_OUT. Specifically, when the third time point t2 elapses, the supply of the count enable clock signal CNT_EN input to the code generator 531 is stopped.

As a result, a count value corresponding to a voltage level Vrst of the reset signal may be obtained by starting the count of the count result signal CNT_OUT of the counter 530 at the first time point t0, which is the generation time point of the ramp signal RAMP, and counting the clock signal until the second time point t1 at which the comparison processing by the comparator 520 is performed and the inverted output signal is obtained. According to some exemplary embodiments, a section from the first time point t0 to the third time point t2, which is the section during which the first reading is performed, may be defined as a first sensing period.

After the first reading is completed, before a second reading is started, the counter 530 may make the count value a negative number having the same absolute value according to an inversion signal IVS. Such an operation is to obtain an image signal component Vsig from which the reset component Vrst is removed from a result of the second reading.

In the second reading (e.g., the second sensing period), the image signal component Vsig according to an amount of incident light for each pixel PX in addition to the voltage level Vrst of the reset signal is read. For the second reading, the same operation as the first reading may be performed.

For the second reading, the comparator 520 inverts the comparison result signal COMP_OUT from a logic low level to a logic high level from a fourth time point t3 at which the ramp signal RAMP starts to fall to a fifth time point t4 at which the ramp signal RAMP becomes equal to the pixel signal PX_OUT. In this case, the counter 530 stops a counting operation at the fifth time point t4 at which the comparison result signal COMP_OUT of the comparator 520 is inverted from the logic high level to the logic low level, and latches the count value up to that time point as data. According to some exemplary embodiments of the present disclosure, the latched count value may be implemented as a count code Code<0:5>. Therefore, the counting operation may be performed from the fourth time point t3 to the fifth time point t4.

A count enable clock signal CNT_EN may be input to the counter 530, and may be toggled from the fourth time point t3 at which the ramp signal RAMP starts to fall to a sixth time point t5, which is the last time point at which the ramp signal RAMP falls. Specifically, when the sixth time point t5 elapses, the supply of the count enable clock signal CNT_EN input to the counter 530 may be stopped.

As a result, a count value corresponding to the image signal component Vsig from which the reset component Vrst is removed may be obtained by starting the count of the count result signal CNT_OUT of the counter 530 at the fourth time point t3, which is the generation time point of the ramp signal RAMP, and counting the clock signal until the fifth time point t4 at which the comparison processing by the comparator 520 is performed and the inverted output signal is obtained. That is, after the first reading, the count value in the counter 530 becomes a negative number having an absolute value of the reset component Vrst by the inversion signal IVS. Since the counter 530 starts counting from the negative number having the absolute value of the reset component Vrst at the time of the second reading, it is substantially the same as subtraction, and the count result signal CNT_OUT according to the subtraction result may be maintained in the counter 530. Consequently, a result value corresponds to a digital value corresponding to "(Vrst+Vsig)+(−Vrst)=Vsig". Here, the count result signal CNT_OUT may correspond to 12 bits.

Since the count result signal CNT_OUT corresponds to 12 bits, a quality of an image corresponding to a dark region may be improved. That is, compared to the case where the count result signal CNT_OUT corresponds to 10 bits, when the count result signal CNT_OUT corresponds to 12 bits, noise of the image corresponding to the dark region may be further reduced.

Figure 9:
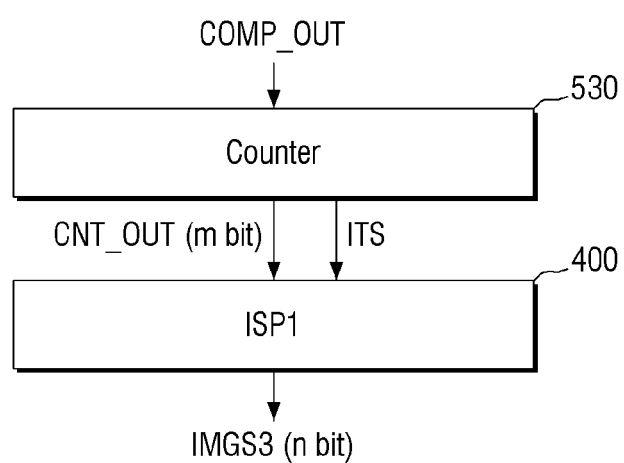
FIG. 9 illustrates a block diagram descriptive of a count result signal and correction thereof, according to embodiments of the inventive concepts.
Figure 10:
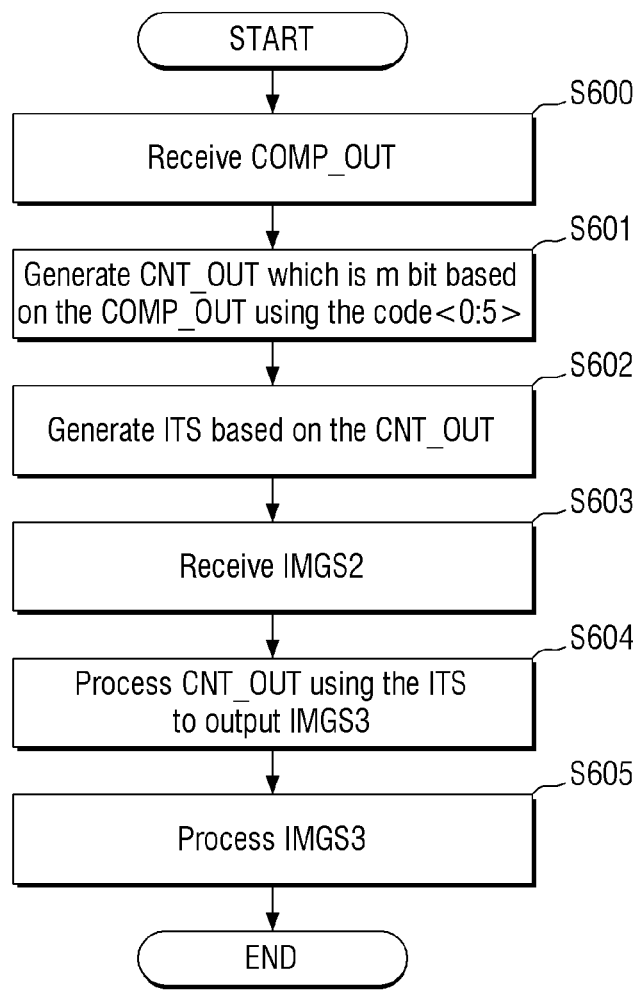
FIG. 10 illustrates a flowchart descriptive of generation of a count result signal and correction thereof, according to embodiments of the inventive concepts.
Figure 11:
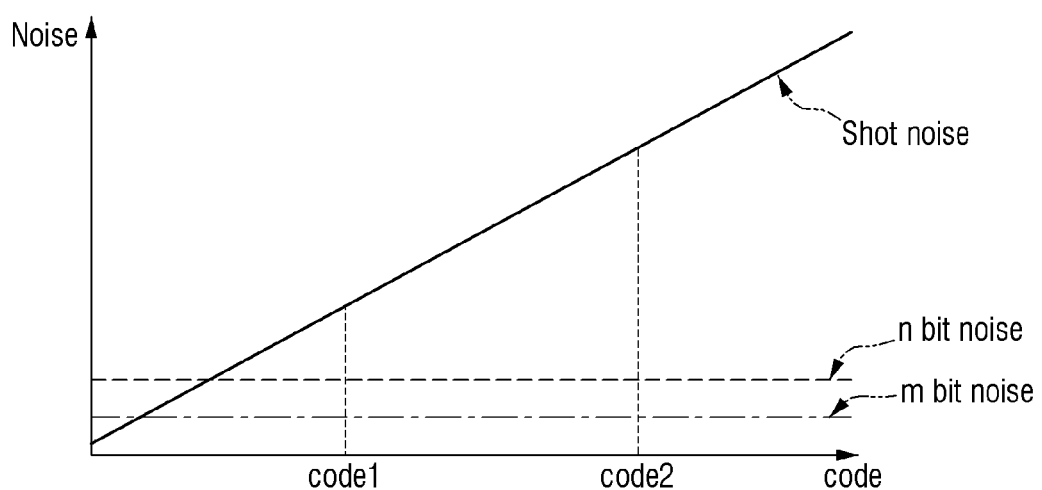
FIG. 11 illustrates a graph of noise power according to codes according to embodiments of the inventive concepts.
Figure 12:
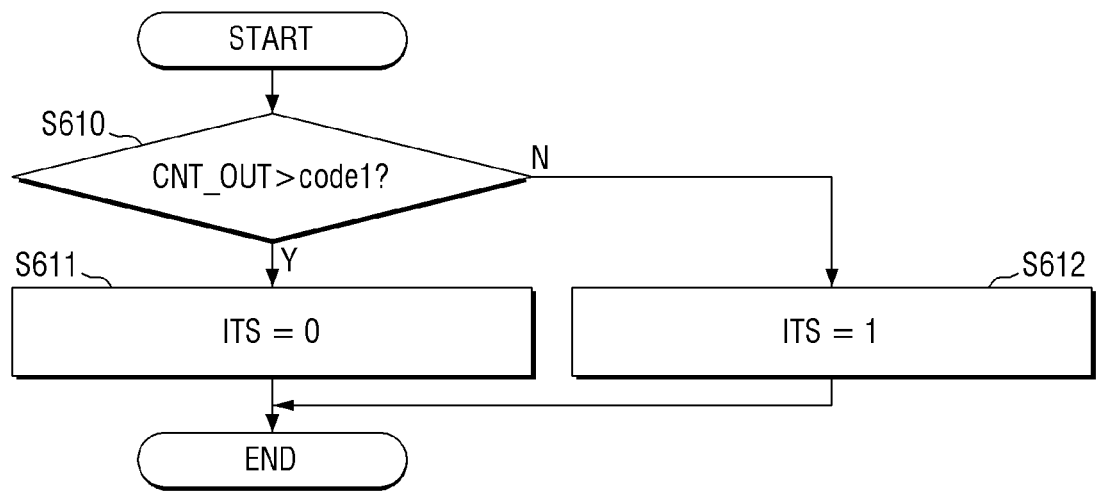
FIG. 12 illustrates a flowchart descriptive of a method of generating intensity data according to embodiments of the inventive concepts.

FIG. 9 illustrates a block diagram descriptive of generation of a count result signal and correction thereof, according to embodiments of the inventive concepts. FIG. 10 illustrates a flowchart descriptive of generation of a count result signal and correction thereof, according to embodiments of the inventive concepts. FIG. 11 illustrates a graph of noise power according to codes according to. FIG. 12 illustrates a flowchart descriptive of a method of generating intensity data according to embodiments of the inventive concepts.

Referring to FIG. 9, the counter 530 may generate a count result signal CNT_OUT corresponding to m bits based on the comparison result signal COMP_OUT, and may also output intensity data ITS based on a code value of the count result signal CNT_OUT. Here, the intensity data ITS may vary according to an intensity value of the count result signal CNT_OUT. For example, when the count result signal CNT_OUT corresponds to the dark portion, the intensity data ITS may be 1, and when the count result signal CNT_OUT does not correspond to the dark portion (e.g., noise), the intensity data ITS may be 0. The count result signal CNT_OUT and its intensity data ITS may be provided to the first image signal processor 400, and the first image signal processor 400 may output a third image signal IMGS3 corresponding to n bits based on the count result signal CNT_OUT and its intensity data ITS. Here, m may correspond to an integer greater than n. For example, m may be 12 and n may be 10. However, the exemplary embodiment of the present disclosure is not limited thereto.

Referring to FIGS. 4 and 9 to 12, the counter 530 may receive the comparison result signal COMP_OUT (S600). Subsequently, the counter 530 may generate a count result signal CNT_OUT corresponding to m bits based on the comparison result signal COMP_OUT using the zero-th to fifth count codes Code<0> to Code<5> (S601). That is, the counter 530 may output the count result signal CNT_OUT corresponding to m bits (e.g., 12 bits) by counting the comparison result signal COMP_OUT. In addition, the counter 530 may generate intensity data ITS based on the count result signal CNT_OUT (S602).

Referring to FIG. 12, the intensity data ITS may be generated in S602 as follows. The counter 530 may determine whether the count result signal CNT_OUT is greater than the first code code1 (S610). If the count result signal CNT_OUT is greater than the first code code1 (Y in S610), the intensity data ITS may correspond to 0 (S611). That is, the intensity data ITS represents the case where the count result signal CNT_OUT does not correspond to the dark portion. If the count result signal CNT_OUT is not greater than the first code code1 (N in S610), the intensity data ITS may correspond to 1 (S612). That is, the intensity data ITS in this case represents the case where the count result signal CNT_OUT corresponds to the dark portion.

Referring back to FIG. 10, the first image signal processor 400 may receive the second image signal IMGS2 (S603). Here, the second image signal IMGS2 may include the count result signal CNT_OUT and the intensity data ITS. That is, the second image signal IMGS2 may correspond to a digital signal and may correspond to m bits.

Referring to FIG. 11, when the code corresponds to the first code code1, the image signal may include shot noise corresponding to analog noise and n bit noise or m bit noise corresponding to digital noise. Here, the m bit noise is noise corresponding to a case in which the counter 530 outputs the count result signal CNT_OUT in m bits, and the n bit noise corresponds to noise corresponding to a case in which the counter 530 outputs the count result signal CNT_OUT in n bits. m is greater than n. In this case, the m bit noise may be smaller than the n bit noise.

When the code is smaller than the first code code1, the corresponding image signal may correspond to the dark portion. In this case, a ratio of digital noise among the sum of all noises may be relatively large. That is, when the code corresponds to a second code code2 greater than the first code code1, the corresponding image signal may not be the dark portion. In this case, the ratio of digital noise among the sum of all noises may be relatively small.

When the code is smaller than the first code code1, the ratio of the digital noise among all noises may be large if the digital noise corresponds to the n bit noise. However, when the code is smaller than the first code code1, the ratio of the digital noise among all noises may be relatively small if the digital noise corresponds to the m bit noise. Therefore, when the code corresponding to the dark portion is smaller than the first code code1, the noise may be reduced to provide an image with improved quality if the digital noise corresponds to the m-bit noise.

Referring back to FIG. 10, the first image signal processor 400 may output the third image signal IMGS3 by processing the count result signal CNT_OUT using the intensity data ITS (S604).

Figure 13:
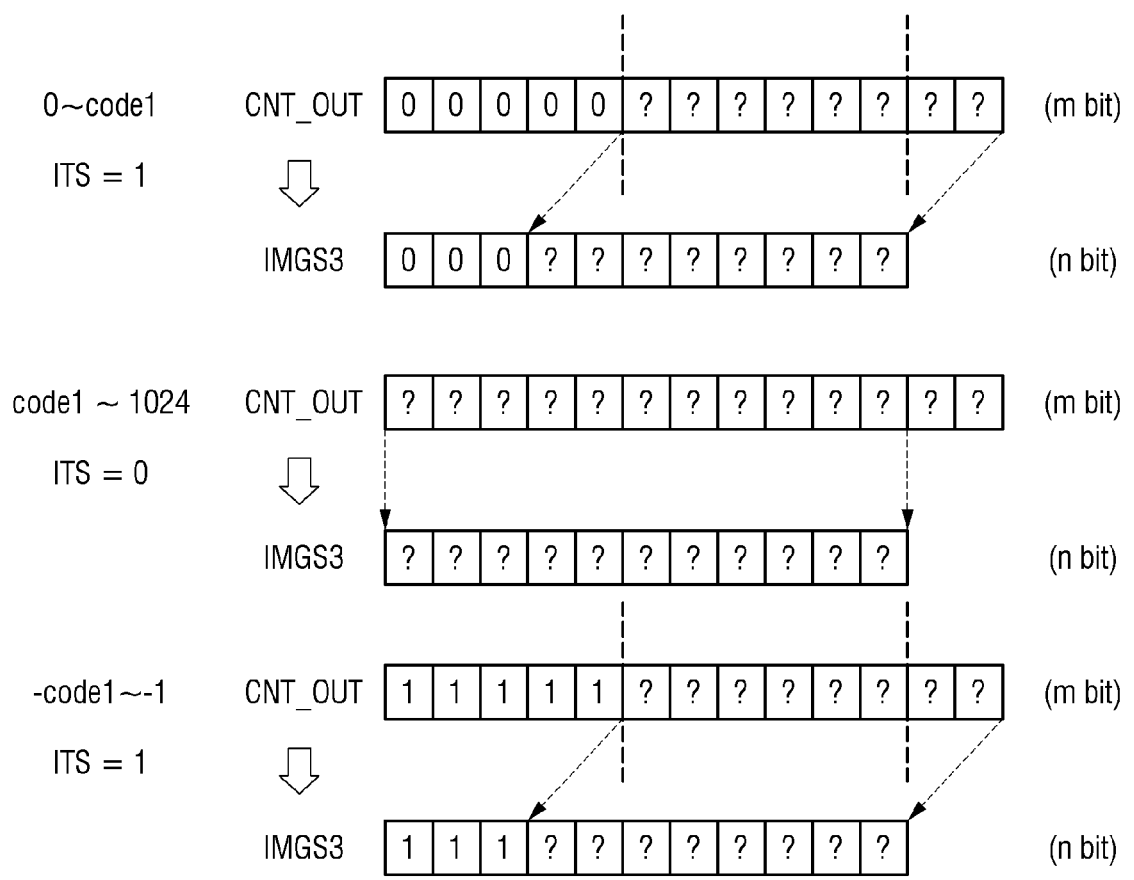
FIG. 13 illustrates a diagram descriptive of a method for correcting an image by the first image signal processor.

FIG. 13 illustrates a diagram descriptive of a method for correcting an image by the first image signal processor 400 as corresponding to S604 in FIG. 12.

Referring to FIG. 13, when the code corresponds to a range of 0 to the first code code1 (i.e., 0~code 1), the count result signal CNT_OUT may correspond to the dark portion, and its intensity data ITS may correspond to 1. In this case, an upper bit(s) of the count result signal CNT_OUT may correspond to an unnecessary value. Therefore, the first image signal processor 400 may convert the count result signal CNT_OUT corresponding to m bits into the third image signal IMGS3 corresponding to n bits. The third image signal IMGS3 may include information having 10 bits from the lower bits. Here, the upper bits deleted may for example include the m-th bit to the (n+1)-th bits of the count result signal CNT_OUT (e.g., the two uppermost bits). As the third image signal IMGS3 includes information on the dark portion, the quality of the output image may be further improved. In addition, power consumed when the count result signal CNT_OUT corresponding to m bits greater than n bits is processed by the first image signal processor 400 may be greater than power consumed when the count result signal CNT_OUT corresponding to n bits is processed by the first image signal processor 400. Therefore, as the third image signal IMGS3 corresponding to n bits is generated, a load of the first image signal processor 400 may be further reduced.

In the case when the code corresponds to a range of a first negative code −code1 to 0 (i.e., −code 1~0 in FIG. 13), the count result signal CNT_OUT corresponding to m bits may be converted into the third image signal IMGS3 corresponding to n bits.

When the code corresponds to a range of the first code code1 or higher (i.e., code 1~1024 in FIG. 13), the count result signal CNT_OUT may not correspond to the dark portion. In this case, a lower bit(s) of the count result signal CNT_OUT may correspond to an unnecessary value. Therefore, the first image signal processor 400 may convert the count result signal CNT_OUT corresponding to m bits into the third image signal IMGS3 corresponding to n bits. The third image signal IMGS3 may include information having 10 bits from the upper bits. Here, the lower bits deleted may for example include the first bit to (m+1)-th bits of the count result signal CT-OUT signal (e.g., the two lowermost bits). In addition, as the third image signal IMGS3 corresponding to n bits smaller than m bits is generated, the load of the first image signal processor 400 may be further reduced.

Referring back to FIG. 10, the first image signal processor 400 may process the third image signal IMGS3 (S605). That is, the first image signal processor 400 may output a corrected image signal by processing the third image signal IMGS3 converted into n bits. In this case, noise of the third image signal IMGS3 corresponding to n bits may be reduced, and the load of the first image signal processor 400 may also be reduced.

Hereinafter, a counter 530 and a second image signal processor 900 according to another exemplary embodiment will be described with reference to FIG. 14.

Figure 14:
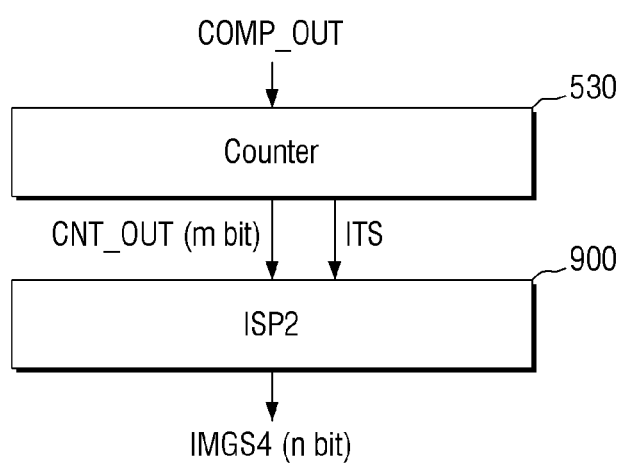
FIG. 14 illustrates a block diagram descriptive of a method for correcting an image by the second image signal processor according to embodiments of the inventive concepts.

FIG. 14 illustrates a block diagram descriptive of a method for correcting an image by the second image signal processor 900 according to embodiments of the inventive concepts. For convenience of explanation, portions of the description overlapping those presented with reference to FIGS. 1 to 13 will be briefly mentioned or omitted for the sake of brevity.

Referring to FIG. 14, the second image signal processor 900 (see FIG. 1) may receive the count result signal CNT_OUT and the intensity data ITS from the counter 530. In this case, the first image signal processor 400 may provide the count result signal CNT_OUT and the intensity data ITS to the second image signal processor 900. That is, the first image signal processor 400 may not perform correction on the count result signal CNT_OUT.

The second image signal processor 900 may output a fourth image signal IMGS4 corresponding to n bits based on the count result signal CNT_OUT corresponding to m bits. Here, the first image signal processor 400 may be disposed inside the image sensor 100, but the second image signal processor 900 may be disposed outside the image sensor 100. That is, the second image signal processor 900 may be implemented by an application processor or the like. As the second image signal processor 900 disposed outside the image sensor 100 converts the count result signal CNT_OUT corresponding to m bits into the fourth image signal IMGS4 corresponding to n bits, the load of the second image signal processor 900 may be reduced.

Hereinafter, an image sensor 100 and an application processor 800 according to another exemplary embodiment will be described with reference to FIGS. 15 to 17.

Figure 15:
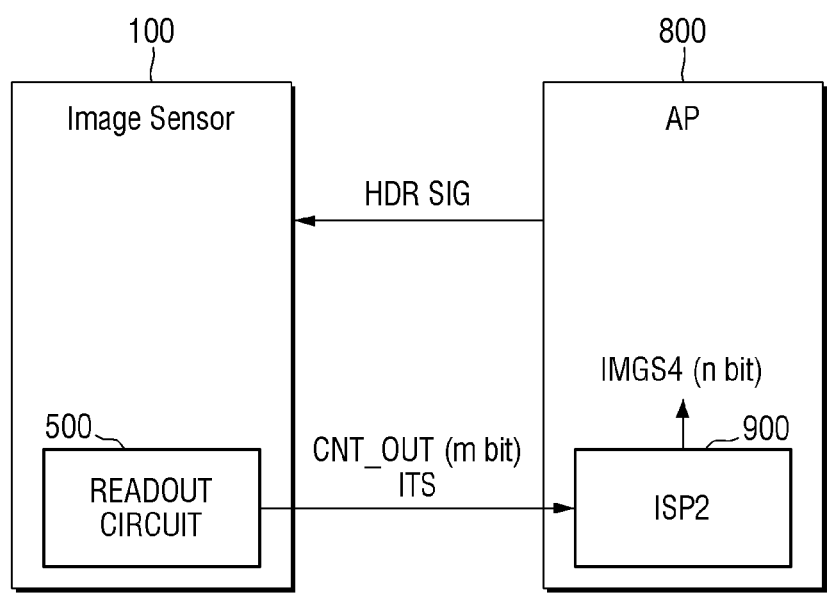
FIG. 15 illustrates a diagram descriptive of a method of generating an image signal by an application processor and an image sensor according to embodiments of the inventive concepts.

FIG. 15 illustrates a diagram descriptive of a method of generating an image signal by an application processor and an image sensor according to embodiments of the inventive concepts. FIGS. 16 and 17 illustrate further embodiments descriptive of methods of generating an image signal according to embodiments of the inventive concepts. For convenience of explanation, portions of description overlapping those presented with reference to FIGS. 1 to 14 will be briefly mentioned or omitted for the sake of brevity.

Referring to FIG. 15, the application processor 800 may provide a high dynamic range (HDR) indication signal HDR SIG to the image sensor 100. The image sensor 100 may operate in an HDR mode in response to the HDR indication signal HDR SIG. For example, when receiving the HDR indication signal HDR SIG, the image sensor 100 may output a count result signal CNT_OUT corresponding to m bits. In addition, the image sensor 100 may provide the count result signal CNT_OUT and the intensity data ITS (as generated by readout circuit 500) to the application processor 800 in response to the HDR indication signal HDR SIG.

The second image signal processor 900 included in the application processor 800 may generate a fourth image signal IMGS4 based on the count result signal CNT_OUT and the intensity data ITS. That is, the second image signal processor 900 may convert the count result signal CNT_OUT corresponding to m bits into the fourth image signal IMGS4 corresponding to n bits. Such an operation may be monitored by an interface between the application processor 800 and the image sensor 100.

Figure 16:
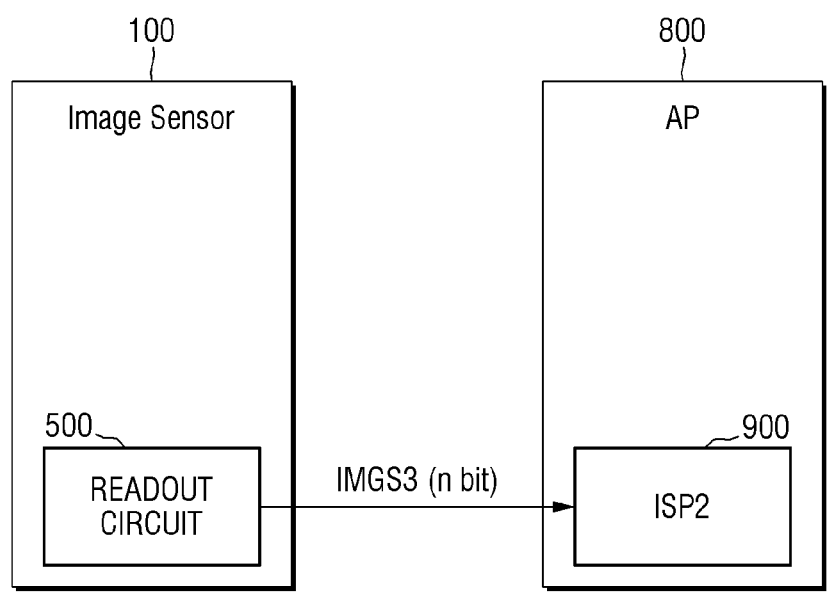
FIG. 16 illustrates a diagram descriptive of a method of generating an image signal by an application processor and an image sensor according to other embodiments of the inventive concepts.

FIG. 16 illustrates a diagram descriptive of a method of generating an image signal by an application processor and an image sensor according to embodiments of the inventive concepts.

Referring to FIG. 16, the application processor 800 may not provide an HDR indication signal HDR SIG to the image sensor 100. When the image sensor 100 does not receive an HDR indication signal HDR SIG, the image sensor 100 may operate in a normal mode. In this case, the image sensor 100 may provide the third image signal IMGS3 corresponding to n bits. In this case, the readout circuit 500 of the image sensor 100 may output a count result signal CNT_OUT corresponding to n bits output by the counter 530. That is, the image sensor 100 does not output a count result signal CNT_OUT corresponding to m bits.

Figure 17:
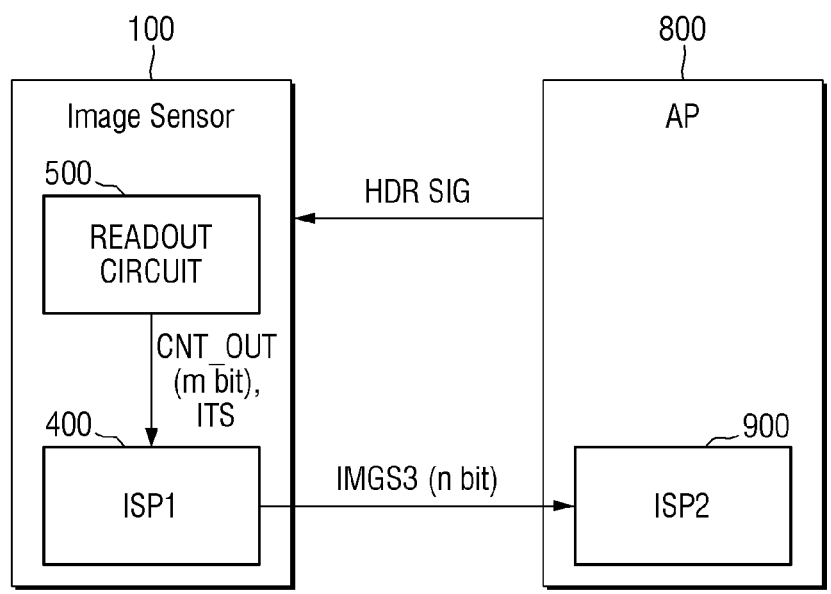
FIG. 17 illustrates a diagram descriptive of a method of generating an image signal by an application processor and an image sensor according to other embodiments of the inventive concepts.

FIG. 17 illustrates a diagram descriptive of a method of generating an image signal by an application processor and an image sensor according to embodiments of the inventive concepts.

Referring to FIG. 17, the application processor 800 may provide an HDR indication signal HDR SIG to the image sensor 100. The image sensor 100 may operate in an HDR mode in response to the HDR indication signal HDR SIG. For example, when receiving the HDR indication signal HDR SIG, the image sensor 100 (i.e., the readout circuit 500) may generate a count result signal CNT_OUT corresponding to m bits. The first image signal processor 400 inside the image sensor 100 may generate a third image signal IMGS3 corresponding to n bits based on the count result signal CNT_OUT corresponding to m bits. The third image signal IMGS3 may be provided to the application processor 800. That is, in response to the HDR indication signal HDR SIG from the application processor 800, the image sensor 100 may provide the third image signal IMGS3 corresponding to n bits to the application processor 800.

Accordingly, embodiments of the inventive concepts may provide an application processor 800 and an image sensor 100 such as shown in any of FIGS. 15-17, wherein the image sensor 100 may operate in an HDR mode in response to the HDR indication signal HDR SIG to generate a count result signal CNT_OUT corresponding to (i.e., having) m bits, and may operate in a normal mode when the image sensor 100 does not receive an HDR indication signal HDR SIG to generate a count result signal CNT_OUT corresponding to (i.e., having) n bits. For example, the embodiments described with respect to FIGS. 15-17 may be variously combined.

Figure 18:
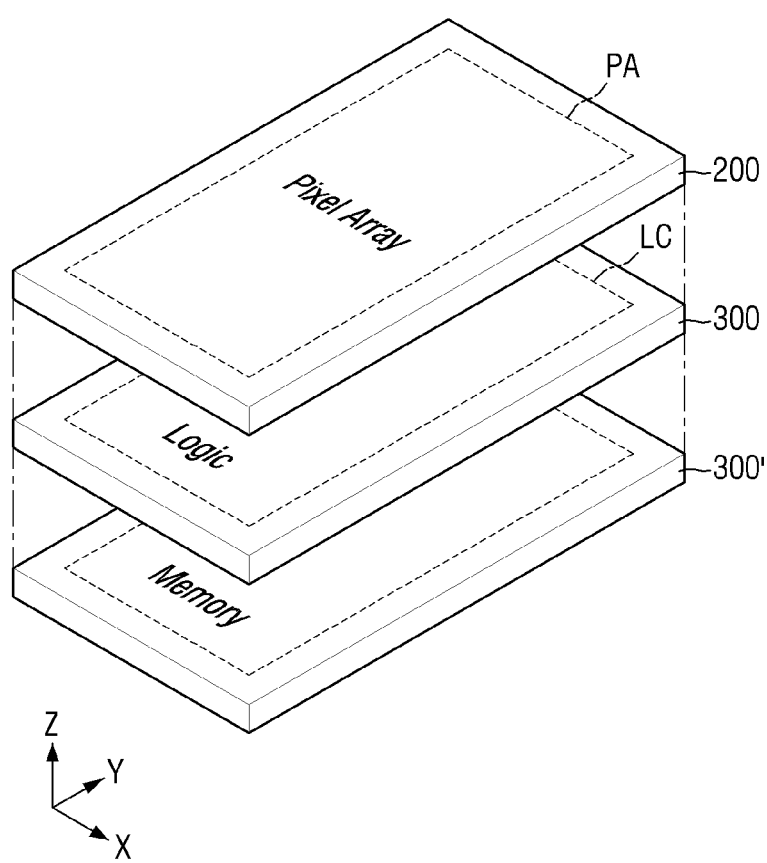
FIG. 18 illustrates a diagram of a conceptual layout of an image sensor according to embodiments of the inventive concepts.

FIG. 18 illustrates a diagram of a conceptual layout of an image sensor according to embodiments of the inventive concepts.

Referring to FIG. 18, an image sensor 100" may include an upper chip 200, a lower chip 300, and a memory chip 300'. Here, the upper chip 200, the lower chip 300, and the memory chip 300' may be sequentially stacked along a third direction Z. The memory chip 300' may be disposed on a lower side of the lower chip 300. The memory chip 300' may include a memory device. The memory chip 300' may receive signals from the upper chip 200 and the lower chip 300 and process the signals through the memory device. That is, the image sensor 100" including the memory chip 300' may correspond to a three-stack image sensor.

Hereinafter, an electronic device 2000 according to some other exemplary embodiments will be described with reference to FIGS. 19 and 20.

Figure 19:
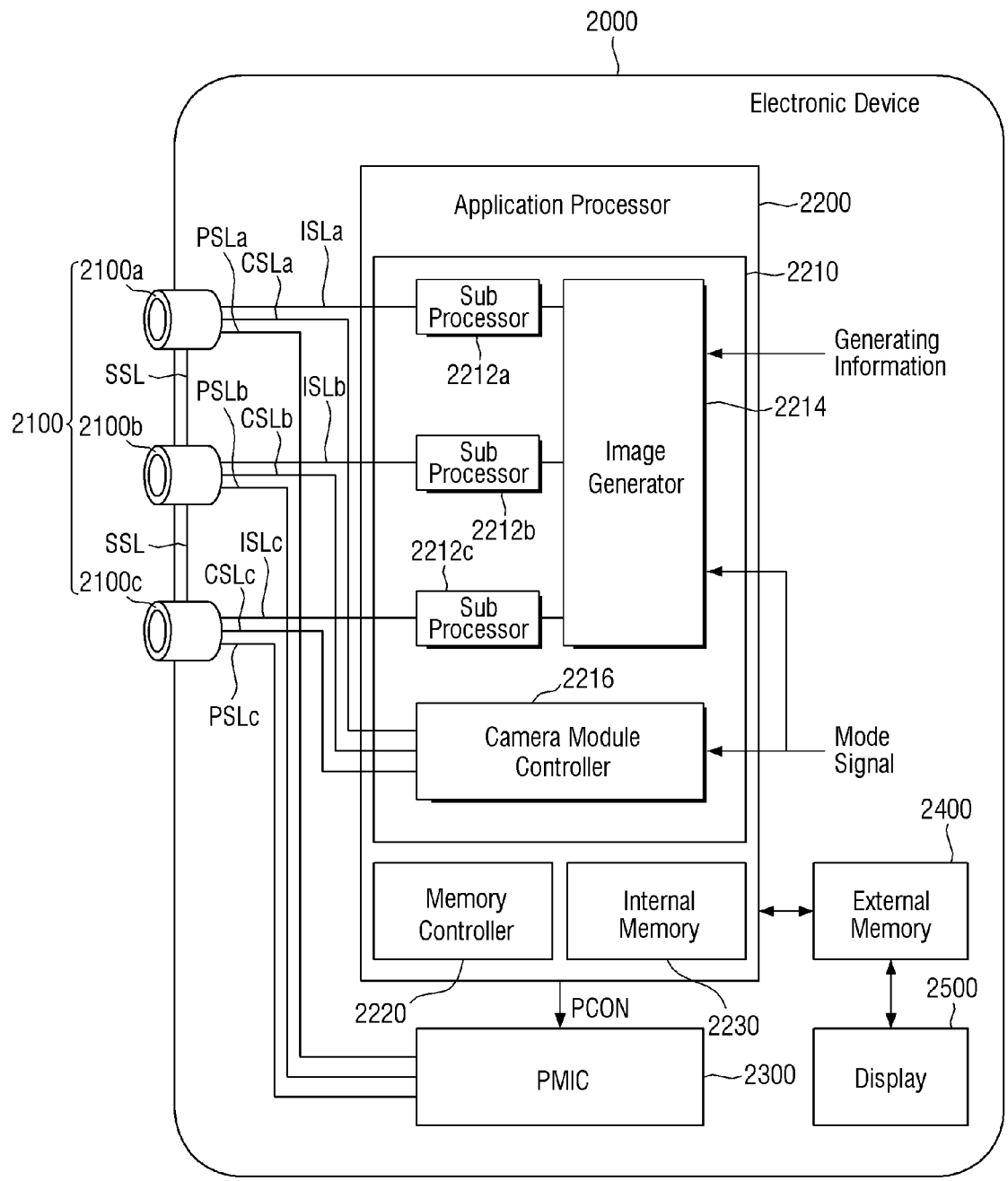
FIG. 19 illustrates a block diagram of an electronic device including a multi-camera module according to embodiments of the inventive concepts.

FIG. 19 illustrates a block diagram descriptive of an electronic device including a multi-camera module according to embodiments of the inventive concepts. FIG. 20 illustrates a detailed block diagram of the camera module of FIG. 19. For convenience of explanation, portions of description overlapping those presented above with reference to FIGS. 1 to 18 will be briefly mentioned or omitted for the sake of brevity.

Referring to FIG. 19, an electronic device 2000 may include a camera module group 2100, an application processor 2200, a power management integrated circuit (PMIC) 2300, an external memory 2400, and a display 2500.

The camera module group 2100 may include a plurality of camera modules 2100a, 2100b, and 2100c. Although an exemplary embodiment in which three camera modules 2100a, 2100b, and 2100c are disposed has been illustrated, exemplary embodiments are not limited thereto. In some exemplary embodiments, the camera module group 2100 may be modified to include only two camera modules. In addition, in some exemplary embodiments, the camera module group 2100 may be modified to include n (n is a natural number of 4 or more) camera modules.

Here, one of the three camera modules 2100a, 2100b, and 2100c may be a camera module including the image sensor 100 described with reference to FIGS. 1 to 18.

Hereinafter, a detailed configuration of the camera module 2100b will be described in more detail with reference to FIG. 20, but the following description may be equally applied to other camera modules 2100a and 2100c according to an exemplary embodiment.

Figure 20:
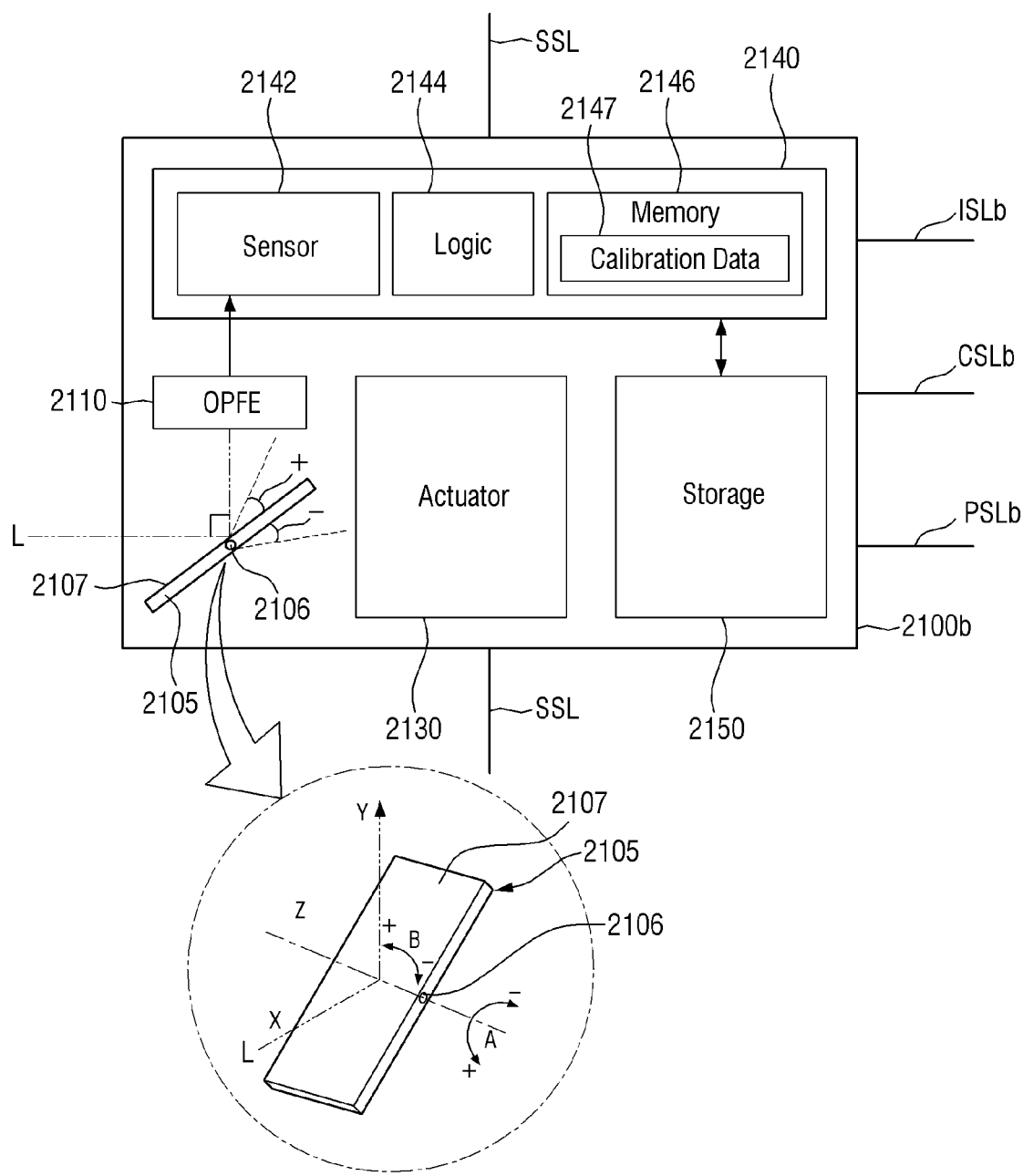
FIG. 20 illustrates a block diagram of the camera module of FIG. 19.

Referring to FIG. 20, the camera module 2100b may include a prism 2105, an optical path folding element (hereinafter, referred to as an "OPFE") 2110, an actuator 2130, an image sensing device 2140, and a storage 2150.

The prism 2105 may include a reflective surface 2107 made of a light reflective material to change a path of light L incident from the outside.

In some exemplary embodiments, the prism 2105 may change a path of light L incident in a first direction X to a second direction Y perpendicular to the first direction X. In addition, the prism 2105 may rotate the reflective surface 2107 made of the light reflective material in an A direction about a central shaft 2106 or rotate the reflective surface 2107 made of the light reflective material in a B direction about the central shaft 2106 to change the path of the light L incident in the first direction X to the second direction Y perpendicular to the first direction X. In this case, the OPFE 2110 may also move in the third direction Z perpendicular to the first direction X and the second direction Y.

In some exemplary embodiments, as illustrated in FIG. 20, a maximum rotation angle of the prism 2105 in the A direction may be 15 degrees or less in a positive (+) A direction and greater than 15 degrees in a negative (−) A direction, but exemplary embodiments are not limited thereto.

In some exemplary embodiments, the prism 2105 may move by about 20 degrees, between 10 degrees and 20 degrees, or between 15 degrees and 20 degrees in a positive (+) or negative (−) B direction. Here, the prism 2105 may move by the same angle in the positive (+) or negative (−) B direction or may move by a substantially similar angle in the range of about 1 degree.

In some exemplary embodiments, the prism 2105 may move the reflective surface 2107 made of the light reflective material in the third direction (e.g., the Z direction) parallel to an extension direction of the central shaft 2106.

The OPFE 2110 may include, for example, optical lenses consisting of p (here, p is a natural number) groups. The p optical lenses may move in the second direction Y to change an optical zoom ratio of the camera module 2100b. For example, when a basic optical zoom ratio of the camera module 2100b is Z, in a case where the p optical lenses included in the OPFE 2110 are moved, the optical zoom ratio of the camera module 2100b may be changed to an optical zoom ratio of 3Z or 5Z or more.

The actuator 2130 may move the OPFE 2110 or the optical lenses (hereinafter, referred to as an optical lens) to a specific position. For example, the actuator 2130 may adjust a position of the optical lens so that an image sensor 2142 is positioned at a focal length of the optical lens for accurate sensing.

The image sensing device 2140 may include the image sensor 2142, a control logic 2144, and a memory 2146. The image sensor 2142 may sense an image of a sensing target using the light L provided through the optical lens. In some exemplary embodiments, the image sensor 2142 may include the image sensor 100 described above.

The control logic 2144 may control a general operation of the camera module 2100b. For example, the control logic 2144 may control an operation of the camera module 2100b according to a control signal provided through a control signal line CSLb.

The memory 2146 may store information necessary for the operation of the camera module 2100b, such as calibration data 2147. The calibration data 2147 may include information necessary for the camera module 2100b to generate image data using the light L provided from the outside. The calibration data 2147 may include, for example, information on the degree of rotation, information on the focal length, and information on the optical axis, described above. When the camera module 2100b is implemented in the form of a multi-state camera of which a focal length is changed according to the position of the optical lens, the calibration data 2147 may include information related to focal length values and auto focusing for each position (or each state) of the optical lens.

The storage 2150 may store image data sensed by the image sensor 2142. The storage 2150 may be disposed outside the image sensing device 2140, and may be implemented in a form in which it is stacked with a sensor chip constituting the image sensing device 2140. In some exemplary embodiments, the storage 2150 may be implemented as electrically erasable programmable read-only memory (EEPROM), but exemplary embodiments are not limited thereto. The storage 2150 may be implemented by the lower chip 300.

Referring to FIGS. 19 and 20 together, in some exemplary embodiments, each of the plurality of camera modules 2100a, 2100b, and 2100c may include an actuator 2130. Accordingly, each of the plurality of camera modules 2100a, 2100b, and 2100c may include the same or different calibration data 2147 according to an operation of the actuator 2130 included therein.

In some exemplary embodiments, one camera module (e.g., camera module 2100b) of the plurality of camera modules 2100a, 2100b, and 2100c may be a folded lens-type camera module including the prism 2105 and the OPFE 2110 described above, and the remaining camera modules (e.g., camera modules 2100a and 2100c) may be vertical type camera modules that do not include the prism 2105 and the OPFE 2110, but exemplary embodiments are not limited thereto.

In some exemplary embodiments, one camera module (e.g., camera module 2100c) of the plurality of camera modules 2100a, 2100b, and 2100c may be, for example, a vertical type depth camera that extracts depth information using infrared ray (IR). In this case, the application processor 2200 may merge image data provided from such a depth camera and image data provided from another camera module (e.g., camera module 2100a or 2100b) with each other to generate a 3D depth image.

In some exemplary embodiments, at least two camera modules (e.g., camera modules 2100a and 2100c) of the plurality of camera modules 2100a, 2100b, and 2100c may have different fields of view. In this case, for example, optical lenses of at least two camera modules (e.g., two camera modules 2100a and 2100c) of the plurality of camera modules 2100a, 2100b, and 2100c may be different from each other, but the present disclosure is not limited thereto.

In addition, in some exemplary embodiments, fields of view of each of the plurality of camera modules 2100a, 2100b, and 2100c may be different from each other. In this case, the optical lenses included in each of the plurality of camera modules 2100a, 2100b, and 2100c may also be different from each other, but the present disclosure is not limited thereto.

In some exemplary embodiments, the plurality of camera modules 2100a, 2100b, and 2100c may be disposed to be physically separated from each other. That is, the plurality of camera modules 2100a, 2100b, and 2100c do not use divided areas by dividing a sensing area of one image sensor 2142. That is, an independent image sensor 2142 may be disposed inside each of the plurality of camera modules 2100a, 2100b, and 2100c.

Referring back to FIG. 19, the application processor 2200 may include an image processing device 2210, a memory controller 2220, and an internal memory 2230. The application processor 2200 may be implemented to be separated from the plurality of camera modules 2100a, 2100b, and 2100c. For example, the application processor 2200 and the plurality of camera modules 2100a, 2100b, and 2100c may be implemented by being separated from each other as separate semiconductor chips.

The image processing device 2210 may include a plurality of sub image processors (i.e., sub-processors) 2212a, 2212b, and 2212c, an image generator 2214, and a camera module controller 2216.

The image processing device 2210 may include the plurality of sub image processors 2212a, 2212b, and 2212c corresponding to the number of the plurality of camera modules 2100a, 2100b, and 2100c.

Image data generated from each of the camera modules 2100a, 2100b, and 2100c may be provided to the corresponding sub image processors 2212a, 2212b, and 2212c through image signal lines ISLa, ISLb, and ISLc separated from each other. For example, the image data generated from the camera module 2100a may be provided to the sub image processor 2212a through the image signal line ISLa, the image data generated from the camera module 2100b may be provided to the sub image processor 2212b through the image signal line ISLb, and the image data generated from the camera module 2100c may be provided to the sub image processor 2212c through the image signal line ISLc. Such transmission of the image data may be performed using, for example, a camera serial interface (CSI) based on a mobile industry processor interface (MIPI®), but exemplary embodiments are not limited thereto.

Meanwhile, in some exemplary embodiments, one sub image processor may also be disposed to correspond to the plurality of camera modules. For example, the sub image processor 2212a and the sub image processor 2212c may not be implemented to be separated from each other as illustrated in FIG. 19, but may be implemented as integrated into one sub image processor, and the image data provided from the camera module 2100a and the camera module 2100c may be selected through a selection element (e.g., a multiplexer) and then provided to the integrated sub image processor.

The image data provided to each of the sub image processors 2212a, 2212b, and 2212c may be provided to the image generator 2214. The image generator 2214 may generate an output image using the image data provided from each of the sub image processors 2212a, 2212b, and 2212c according to image generating information or a mode signal.

Specifically, the image generator 2214 may merge at least some of the image data generated from the camera modules 2100a, 2100b, and 2100c having different fields of view according to the image generating information (i.e., generating information) or the mode signal (i.e., mode signal) to generate an output image. In addition, the image generator 2214 may select any one of the image data generated from the camera modules 2100a, 2100b, and 2100c having different fields of view according to the image generating information or the mode signal to generate an output image.

In some exemplary embodiments, the image generating information may include a zoom signal or a zoom factor. In addition, in some exemplary embodiments, the mode signal may be, for example, a signal based on a mode selected by a user.

When the image generating information is the zoom signal (zoom factor) and each of the camera modules 2100a, 2100b, and 2100c has different fields of view, the image generator 2214 may perform different operations according to a type of the zoom signal. For example, when the zoom signal is a first signal, the image generator 2214 may merge the image data output from the camera module 2100a and the image data output from the camera module 2100c with each other, and then generate an output image by using a merged image signal and the image data output from the camera module 2100b that is not used for the merging. When the zoom signal is a second signal different from the first signal, the image generator 2214 does not perform such merging of the image data, and may select any one of the image data output from each of the camera modules 2100a, 2100b, and 2100c to generate an output image. However, exemplary embodiments are not limited thereto, and a method for processing the image data may be modified, if necessary.

In some exemplary embodiments, the image generator 2214 may receive a plurality of image data having different exposure times from at least one of the plurality of sub image processors 2212a, 2212b, and 2212c and perform high dynamic range (HDR) processing on the plurality of image data to generate merged image data having an increased dynamic range.

The camera module controller 2216 may provide a control signal to each of the camera modules 2100a, 2100b, and 2100c. The control signal generated from the camera module controller 2216 may be provided to the corresponding camera modules 2100a, 2100b, and 2100c through control signal lines CSLa, CSLb, and CSLc separated from each other.

Any one of the plurality of camera modules 2100a, 2100b, and 2100c may be designated as a master camera (e.g., camera module 2100a) according to the image generating information including the zoom signal or the mode signal, and the remaining camera modules (e.g., camera modules 2100b and 2100c) may be designated as slave cameras. Such information may be included in the control signal and provided to the corresponding camera modules 2100a, 2100b, and 2100c through the control signal lines CSLa, CSLb, and CSLc separated from each other.

The camera modules operating as the master camera and the slave camera may be changed according to the zoom factor or the mode signal. For example, when a field of view of the camera module 2100a is wider than a field of view of the camera module 2100c and the zoom factor indicates a low zoom ratio, the camera module 2100c may operate as the master camera, and the camera module 2100a may operate as the slave camera. On the contrary, when the zoom factor indicates a high zoom ratio, the camera module 2100a may operate as the master camera and the camera module 2100c may operate as the slave camera.

In some exemplary embodiments, the control signal provided from the camera module controller 2216 to each of the camera modules 2100a, 2100b, and 2100c may include a sync enable signal. For example, when the camera module 2100b is the master camera and the camera modules 2100a and 2100c are the slave cameras, the camera module controller 2216 may transmit the sync enable signal to the camera module 2100b. The camera module 2100b receiving such a sync enable signal may generate a sync signal based on the received sync enable signal, and provide the generated sync signal to the camera modules 2100a and 2100c through sync signal lines SSL. The camera module 2100b and the camera modules 2100a and 2100c may transmit the image data to the application processor 2200 in synchronization with such a sync signal.

In some exemplary embodiments, the control signals provided from the camera module controller 2216 to the plurality of camera modules 2100a, 2100b, and 2100c may include mode information according to the mode signal. The plurality of camera modules 2100a, 2100b, and 2100c may operate in a first operation mode and a second operation mode in relation to a sensing speed, based on such mode information.

The plurality of camera modules 2100a, 2100b, and 2100c may generate an image signal at a first speed (e.g., generate an image signal of a first frame rate), encode the image signal at a second speed higher than the first speed (e.g., encode an image signal of a second frame rate higher than the first frame rate), and transmit the encoded image signal to the application processor 2200, in the first operation mode. In this case, the second speed may be 30 times or less the first speed.

The application processor 2200 may store the received image signal, that is, the encoded image signal, in the internal memory 2230 or the external memory 2400 outside the application processor 2200, then read and decode the encoded image signal from the internal memory 2230 or the external memory 2400, and display image data generated based on the decoded image signal. For example, a corresponding sub image processor of the plurality of sub image processors 2212a, 2212b, and 2212c of the image processing device 2210 may perform the decoding, and may also perform image processing on the decoded image signal. For example, image data generated based on the decoded image signal may be displayed on the display 2500.

The plurality of camera modules 2100a, 2100b, and 2100c may generate an image signal at a third speed lower than the first speed (e.g., generate an image signal of a third frame rate lower than the first frame rate) and transmit the image signal to the application processor 2200, in the second operation mode. The image signal provided to the application processor 2200 may be a signal that is not encoded. The application processor 2200 may perform image processing on the received image signal or store the image signal in the internal memory 2230 or the external memory 2400.

The PMIC 2300 may supply power, for example, a source voltage, to each of the plurality of camera modules 2100a, 2100b, and 2100c. For example, the PMIC 2300 may supply first power to the camera module 2100a through a power signal line PSLa, supply second power to the camera module 2100b through a power signal line PSLb, and supply third power to the camera module 2100c through a power signal line PSLc, under the control of the application processor 2200.

The PMIC 2300 may generate power corresponding to each of the plurality of camera modules 2100a, 2100b, and 2100c in response to a power control signal PCON from the application processor 2200, and adjust a level of power. The power control signal PCON may include a power adjustment signal for each operation mode of the plurality of camera modules 2100a, 2100b, and 2100c. For example, the operation mode may include a low power mode, and in this case, the power control signal PCON may include information on a camera module operating in the low power mode and a set level of power. Levels of the power provided to each of the plurality of camera modules 2100a, 2100b, and 2100c may be the same as or different from each other. In addition, the level of power may be dynamically changed.

The exemplary embodiments of the present disclosure have been described above with reference to the accompanying drawings, but it should be understood that the inventive concepts may be implemented in various different forms, and those skilled in the art to which the present disclosure pertains should understand that the inventive concepts may be implemented in other specific forms without changing the technical spirit or essential features of the present disclosure. Therefore, it should be understood that the exemplary embodiments described above are illustrative in all aspects and not restrictive.

What is claimed is:

1. An image sensing device comprising:
a pixel array configured to output a pixel signal;
a comparator configured to output a comparison result signal by comparing a reference signal and the pixel signal;
a counter configured to output a count result signal having m bits by counting the comparison result signal; and
an image signal processor configured to output an image signal having n bits by correcting the count result signal,
wherein m and n are integers, and m is greater than n,
wherein the image signal processor is configured to generate the image signal by deleting first bits of the count result signal, when a value of the count result signal is greater than a first threshold value, and
wherein the image signal processor is configured to generate the image signal by deleting second bits of the count result signal, when the value of the count result signal is not greater than the first threshold value.

2. The image sensing device of claim 1, wherein the first bits include first to (m−n)-th bits of the count result signal, and
the second bits include m-th to (n+1)-th bits of the count result signal.

3. The image sensing device of claim 1, wherein the image signal processor is configured to generate the image signal by deleting the second bits of the count result signal, when the value of the count result signal is not greater than a second threshold value smaller than the first threshold value.

4. The image sensing device of claim 1, wherein the counter is configured to output first intensity data when a value of a first count result signal of the count result signal is greater than a first threshold value, and output second intensity data when a value of a second count result signal of the count result signal is not greater than the first threshold value.

5. The image sensing device of claim 4, wherein the image signal processor is configured to output a first image signal having n bits as the image signal by performing correction on the first count result signal based on the first intensity data, and output a second image signal having n bits as the image signal by performing correction on the second count result signal based on the second intensity data.

6. The image sensing device of claim 1, wherein the counter is configured to count the comparison result signal using six gray codes.

7. The image sensing device of claim 1, wherein m is 12 and n is 10.

8. The image sensing device of claim 1, wherein the counter is configured to output a count result signal having m bits in a high dynamic range (HDR) mode, and output a count result signal having n bits when not in the HDR mode.

9. The image sensing device of claim 1, further comprising an application processor configured to receive the image signal corresponding to the n bits and perform correction on the image signal.

* * * * *